US010740683B2

(12) United States Patent
Andersen et al.

(10) Patent No.: US 10,740,683 B2
(45) Date of Patent: Aug. 11, 2020

(54) DETERMINING AND REPRESENTING HEALTH OF COGNITIVE SYSTEMS

(71) Applicant: INTERNATIONAL BUSINESS MACHINES CORPORATION, Armonk, NY (US)

(72) Inventors: John J. Andersen, Austin, TX (US); Jason E. Doucette, Saskatoon (CA); Sanjay F. Kottaram, Cedar Park, TX (US); Robert L. Turknett, Jr., Austin, TX (US); Wilson L. Wu, Arcadia, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 605 days.

(21) Appl. No.: 15/223,750

(22) Filed: Jul. 29, 2016

(65) Prior Publication Data
US 2018/0032873 A1 Feb. 1, 2018

(51) Int. Cl.
*G06N 5/04* (2006.01)
(52) U.S. Cl.
CPC ..................... *G06N 5/04* (2013.01)
(58) Field of Classification Search
CPC ....................................................... G06N 5/04
See application file for complete search history.

(56) References Cited

U.S. PATENT DOCUMENTS

| 7,567,889 | B2 | 7/2009 | Wismüller |
| 7,627,668 | B2 | 12/2009 | Cardno et al. |
| 7,747,420 | B1 | 6/2010 | Rasmussen et al. |
| 8,660,973 | B1 | 2/2014 | Feigenbaum |
| 9,063,975 | B2 | 6/2015 | Isensee et al. |
| 9,459,766 | B1 | 10/2016 | Haynes et al. |
| 9,558,265 | B1* | 1/2017 | Tacchi ............... G06F 17/30696 |
| 2007/0174010 | A1* | 7/2007 | Bhat ..................... G06T 13/00 702/66 |
| 2007/0185990 | A1* | 8/2007 | Ono ..................... G06F 11/3409 709/224 |
| 2012/0041950 | A1 | 2/2012 | Koll et al. |
| 2015/0019569 | A1 | 1/2015 | Parker et al. |
| 2015/0110340 | A1* | 4/2015 | Harron ............... G06K 9/00744 382/100 |
| 2015/0169395 | A1* | 6/2015 | Giffels ................ G06F 11/0769 714/57 |

(Continued)

OTHER PUBLICATIONS

Craig Reynolds, Boids: Background and Update, Sep. 6, 2001, https://www.red3d.com/cwr/boids/.*

(Continued)

*Primary Examiner* — Alexey Shmatov
*Assistant Examiner* — Ahsif A. Sheikh
(74) *Attorney, Agent, or Firm* — Cantor Colburn LLP; Ingrid M Foerster

(57) ABSTRACT

Technical solutions are described for visually depicting health of a cognitive system. An example computer-implemented method includes accessing a query-log of a question input to the cognitive system. The method also includes generating a query-node corresponding to the question. The method also includes configuring animation parameters of the query-node based on the query-log. The method also includes displaying the query-node according to the animation parameters.

20 Claims, 6 Drawing Sheets

(56) References Cited

U.S. PATENT DOCUMENTS

2017/0085445 A1* 3/2017 Layman ............... H04L 43/045

OTHER PUBLICATIONS

Andrew Vande Moere, "Information Flocking: Time-Varying Data Visualization using Bold Behaviors", IEEE Computer Society, IV '04, pp. 1-6.

Christopher Hartman and Bedrich Benes, "Autonomous Boids" (http://hpcg.purdue.edu/papers/Hartman06CAaVW.pdf); Comp. Anim. Virtual Worlds 2006; 17: 199-206. (Year: 2006).

John J. Andersen et al., "Determining and Representing Health of Cognitive Systems", U.S. Appl. No. 15/223,762, filed Jul. 29, 2016.

List of IBM Patents or Patent Applications Treated as Related; (Appendix P), Filed Jan. 17, 2017; 2 pages.

* cited by examiner

ND REPRESENTING
DETERMINING AND REPRESENTING
HEALTH OF COGNITIVE SYSTEMS

BACKGROUND

The present application relates to computer systems, and more specifically, to determining and representing health of a computer system that is used as a cognitive system.

Typically, machines, such as computer systems, have delivered business and societal benefits by automating, tabulation, and harnessing computational processing and programming to enhance enterprise and personal productivity. Cognitive systems are a next chapter in machines. Cognitive systems ae machines that use natural language processing and machine learning to enable people and machines to interact more naturally to extend and magnify human expertise and cognition. A cognitive system includes computer systems and other types of machines that learn and interact with humans and other machines to provide expert assistance to scientists, engineers, lawyers, and other professionals in a fraction of the time it now takes. The cognitive system, thus, helps people extend their expertise across any domain of knowledge and makes complex decisions involving extraordinary volumes of fast moving Big Data.

For example, in healthcare, the cognitive system such as IBM™ WATSON™ for Oncology helps oncologists treat cancer patients with individualized evidence-based treatment options by analyzing patient data against thousands of historical cases trained through more than 5,000 doctor and analyst hours. The cognitive system can help doctors narrow down the options and pick the best treatments for the patients. The doctor still does most of the thinking. The cognitive system, in this case, facilitates the doctor to make sense of the data and help make the process faster and more accurate. For city leaders, such cognitive systems can help them prepare for major storms, to predict electrical outages, to plan evacuations, and to prepare emergency management equipment and personnel to respond in the areas that will need it most.

Considering that the cognitive system plays significant roles in important fields, it is important to ensure that the cognitive system is operating without failures. Accordingly, determining and representing the health of the cognitive system is a technical problem that needs to be addressed. Further, because the cognitive systems include cognitive capabilities, determining and representing the health of the cognition capabilities of the cognitive systems is a technical problem addressed herein.

Determining and representing the health of the cognitive system is a challenging technical problem to solve using current standards and conventions. Traditional data visualizations such as static charts and graphs are inadequate, due to the amount of multivariate data that the cognitive system handles, and is to be communicated. Static visualizations of the data generated by the cognitive system may become dense and difficult to comprehend. Further, aesthetically, such static visualizations do not convey the intelligence of the cognitive system.

SUMMARY

According to one or more embodiments, a computer-implemented method for visually depicting health of a cognitive system includes accessing a query-log of a question input to the cognitive system. The method also includes generating a query-node corresponding to the question. The method also includes configuring animation parameters of the query-node based on the query-log. The method also includes displaying the query-node according to the animation parameters.

According to one or more embodiments, a system for visually depicting health of a cognitive system includes a memory, a display unit, and a processor coupled with the memory and the display unit. The processor accesses a query-log of a question input to the cognitive system. The processor also generates a query-node corresponding to the question. The processor also configures animation parameters of the query-node based on the query-log. The processor also causes the display unit to display the query-node according to the animation parameters.

According to one or more embodiments, a computer program product for visually depicting health of a cognitive system includes a computer readable storage medium. The computer readable storage medium includes computer executable instructions to access a query-log of a question input to the cognitive system. The computer readable storage medium also includes instructions to generate a query-node corresponding to the question. The computer readable storage medium also includes instructions to configure animation parameters of the query-node based on the query-log. The computer readable storage medium also includes instructions to cause a display unit to display the query-node according to the animation parameters.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Disclosed here are technical solutions for determining and representing health of a cognitive system. The technical solutions herein provide a dynamic, data visualization that facilitates a user to quickly gain an impression of the health of the cognitive system, particularly the cognitive capabilities of the cognitive system. As such the technical solutions are rooted in and/or tied to computer technology in order to overcome a problem specifically arising in the realm of computers, specifically cognitive systems.

In exemplary embodiments, the technical solutions determine and facilitate visualizing the health of the cognitive system using a moving organic form, similar to a flock of birds, animals, insects, or the like. The technical solutions herein combine a backend data service with a front end user-interface to present a moving, three dimensional, visual that gives the user a sense of the health of the system, and is pleasing to watch.

Figure 1:
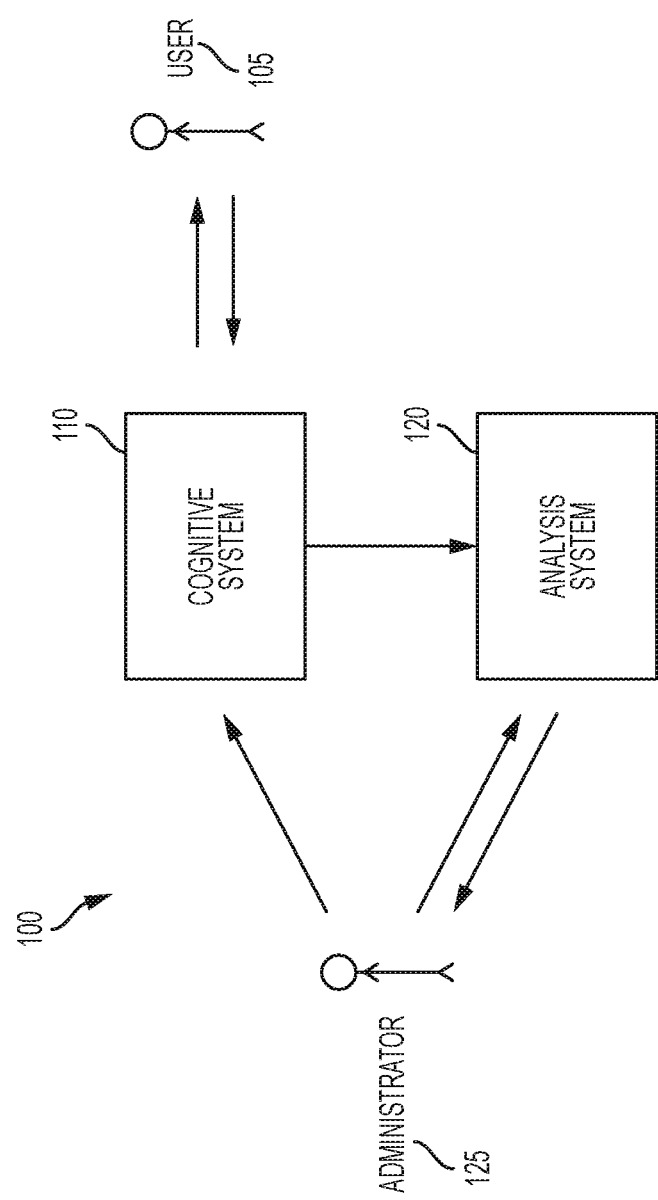
FIG. 1 illustrates an example analysis system that determines and represents the health of a cognitive system in accordance with one or more embodiments.

FIG. 1 illustrates an example scenario 100 in which a user 105, such as a doctor or any other professional, uses a cognitive system 110, for example to analyze medical data. An administrator 125 is responsible for managing the health of the cognitive system 110. The administrator 125 uses an analysis system 120 to determine and visualize the health of the cognitive system 110. The analysis system 120 includes and/or implements the technical solutions described herein.

In an example, the analysis system 120 analyzes the health of the cognitive system 110 and displays a visual representation of the health for facilitating the administrator 125 to identify an action that s/he may take regarding the health of the cognitive system 110. The analysis system 120 may include a computer system, such as a desktop computer, a laptop computer, a tablet computer, a computer server, a smartphone, or any other hardware. The analysis system 120 is coupled with the cognitive system 110 to facilitate the analysis system 120 to access performance data of the cognitive system 110. The analysis system 120 accesses the performance data either wirelessly or in a wired manner using a communication network.

The performance data may include a query-log of the cognitive system 110. For example, the cognitive system 110 receives a query from the user 105 using natural language and responds to the query based on the cognitive capabilities. The query may be in natural language, in the form of text input, speech input, or any other kind of input. The cognitive system 110 identifies a confidence value with which the cognitive system 110 generates a response (or answer) for the query. For example, the cognitive system 110 parses the query syntactically and semantically. After parsing the query, the cognitive system 110 determines the confidence value for the question. The cognitive system 110 may store the confidence value in the query-log associated with an entry corresponding to the question.

Figure 2:
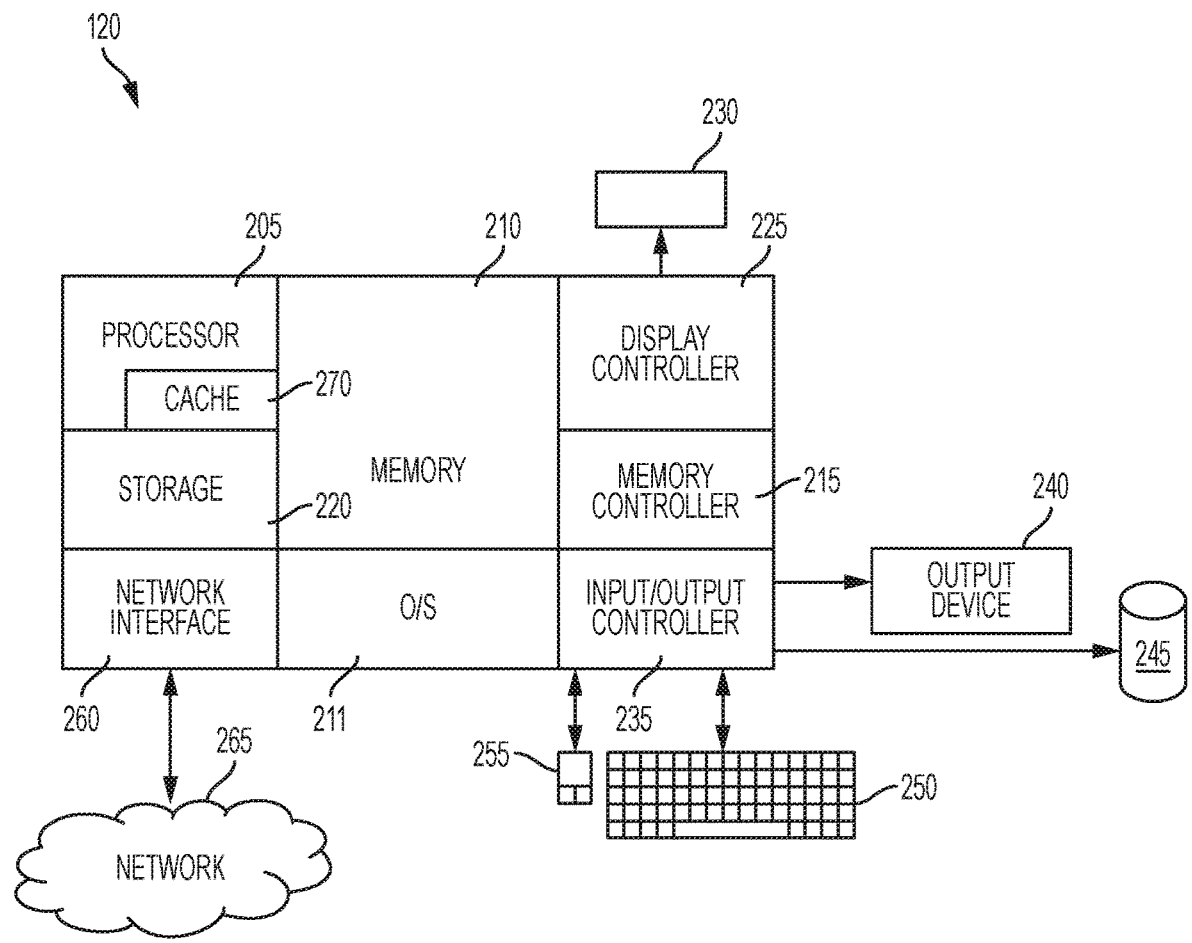
FIG. 2 illustrates example components of the analysis system in accordance with one or more embodiments.

FIG. 2 illustrates example components of the analysis system 120. The analysis system 120 includes hardware, such as electronic circuitry. For example, the analysis system 120 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the analysis system 120, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The analysis system 120 may further include a display controller 225 coupled to a user interface or display 230. In some embodiments, the display 230 may be an LCD screen. In other embodiments, the display 230 may include a plurality of LED status lights. In some embodiments, the analysis system 120 may further include a network interface 260 for coupling to a network 265. The network 265 may be an IP-based network for communication between the analysis system 120 and an external server, client and the like via a broadband connection. In an embodiment, the network 265 may be a satellite network. The network 265 transmits and receives data between the analysis system 120 and external systems. In some embodiments, the network 265 may be a managed IP network administered by a service provider. The network 265 may be implemented in a wireless fashion, for example, using wireless protocols and technologies, such as WIFI™, WIMAX™, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
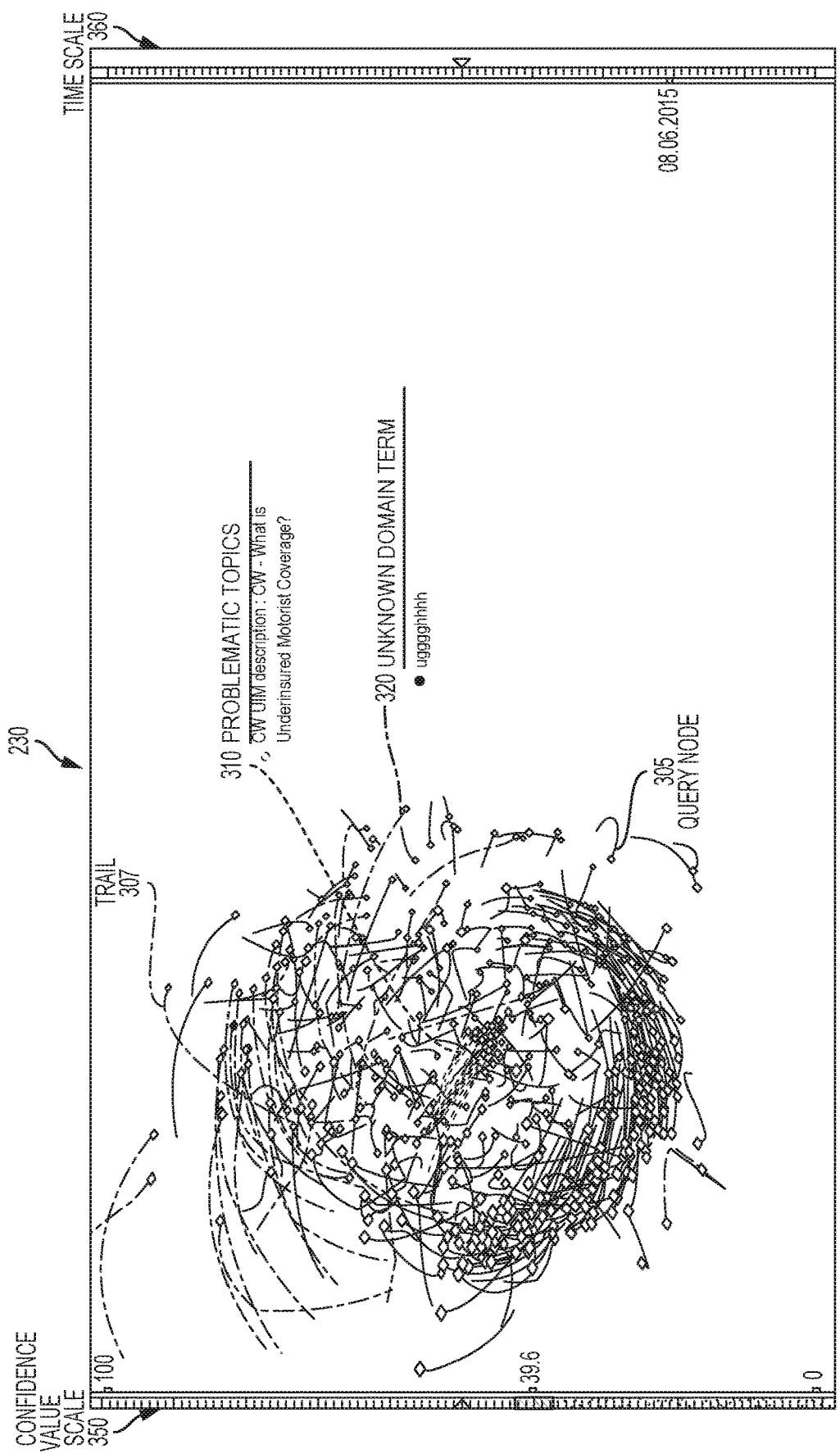
FIG. 3 illustrates an example visualization of the health of a cognitive system in accordance with one or more embodiments.

The analysis system 120 accesses the performance data from the cognitive system 110 using the network 265. The analysis system 120 further analyzes the performance data to determine the health of the cognitive system 110. Additionally, or alternatively, the analysis system 120 generates a visualization to depict or represent the health of the cognitive system 110. The analysis system 120 displays the visualization FIG. 3 illustrates an example visualization of the health of the cognitive system 110 that the analysis system 120 displays using the display 230. The display 230 presents the user-interface to the administrator 125. The user-interface includes a confidence value scale 350 and a time scale 360, among other components to facilitate the administrator 125 (that is, user of the analysis system 120) to configure the visualization. Based on the configuration from the administrator 125, the analysis system generates and displays the visualization, which includes a movement pattern, (referred to as flight behavior) of "boids" to visualize the health of the cognitive system 110. A boid is a query-node 305 that the analysis system 120 displays on the user-interface.

In one or more examples, the analysis system 120 generates the query-node 305 corresponding to an entry in the query-log of the cognitive system 110. Thus, if the query-log includes multiple entries corresponding to multiple queries received by the cognitive system 110, the analysis system 120 generates multiple query-nodes corresponding to the entries in the query-log respectively. The analysis system 120 displays the multiple query-nodes on the user-interface to represent the health of the cognitive system 120.

The analysis system 120 represents the health by configuring attributes of the query-node 305 according to the data associated with the corresponding entry in the query-log. The attributes may be animation parameters that cause the query-nodes to be animated. For example, the query-node includes multiple attributes, such as a position, a color, a movement pattern, a trail 307, and a shape, among others. The analysis system 120 configures the query-node 305 based on data associated with the corresponding entry in the query-log, such as confidence value, query-category, and analysis-category, among others. The analysis system 120 displays a flock of the multiple query-nodes corresponding to the multiple entries in the query-log respectively (as illustrated in FIG. 3). The query-node 305 has a trail 307 that depends on one or more attribute of the query-node. For example, the color of trail 307 is based on a type of the question corresponding to the query-node 305.

Thus, each query-node 305 in the flock represents a single question that the cognitive system 110 has been asked by the user 105 (or any other user). In one or more examples, the analysis system 120 determines a movement pattern of each individual query-node 305 based on the confidence level of the cognitive system 120 to answer the question that the query-node 305 represents. The visualization is further based on categories of the respective questions. Accordingly, the query-nodes representing questions that the cognitive system 110 is confident in answering fly in harmony with each other, while the query-nodes representing questions that the cognitive system 110 is not confident in answering fly more erratically. In one or more examples, the cognitive system 110 indicates being confident in answering the question by assigning the question a confidence value above a confidence value threshold. Conversely, the cognitive system 110 assigns a confidence value below the confidence value threshold to the threshold when the cognitive system is not confident in answering. As a result, when the cognitive system 110 is performing well on most questions, the query-nodes appear to flock together, suggesting a harmonious system. Alternately, when the cognitive system 110 is performing poorly, a majority of the query-nodes fly chaotically, in different movement patterns, showing that the cognitive system 110 is in poor health and in need of improvement. Thus, the analysis system 120 displays the health of the cognitive system 110 using a flocking behavior of organisms (such as birds, animals).

In one or more examples, the administrator 125 specifies the confidence threshold value using the confidence value scale 350. For example, the administrator 125 slides a marker along a slider to specify the confidence threshold value. In one or more examples, the confidence value scale 350 facilitates the administrator to specify a lowest confidence value. In response to the selection of the lowest confidence value, the analysis system 120 only analyzes the questions with a confidence value above the lowest confidence value. Accordingly, the confidence value scale 350 facilitates the administrator to filter the questions that are used to determine and represent the health of the cognitive system 110. The analysis system 110, thus, does not use outlier questions that were not formed correctly by the user 105, and in turn preventing false negatives when determining the health of the cognitive system 110.

Additionally, the analysis system 120 facilitates the administrator 125 identifying questions of specific types based on the attributes of the query-nodes. For example, the questions that the cognitive system 110 categorizes as questions pertaining to problematic types may be displayed using a specific color. For example, as illustrated in FIG. 3, the analysis system 120 displays questions that are related to problematic topics 310 using a first color and questions that are related to unknown domain terms 320 using a second color. It is understood that the categorization of the questions may be different and may include more/fewer/different categories than the illustration.

The visualization provides a multi-pronged interface to facilitate the administrator 125 to differentiate areas of interest within the query-log. The visualization provides the administrator 125 user-interactivity to zoom into specific subsets and interact/explore within the subset, for example to check details of each node in the subset. Accordingly, the analysis system 120 facilitates the administrator 125 to filter the data in an interactive manner into sub-categories and zoom into the sub-categories to check the details of questions of a particular type or of a particular question. Based on the details, the administrator 125 may alter the configuration of the cognitive system 110 in order to improve the performance of the cognitive system 110.

It is understood that although FIG. 3 illustrates the scales in specific positions using specific user-interface elements, other examples may include the scales at different positions and/or using different user-interface elements.

Figure 4:
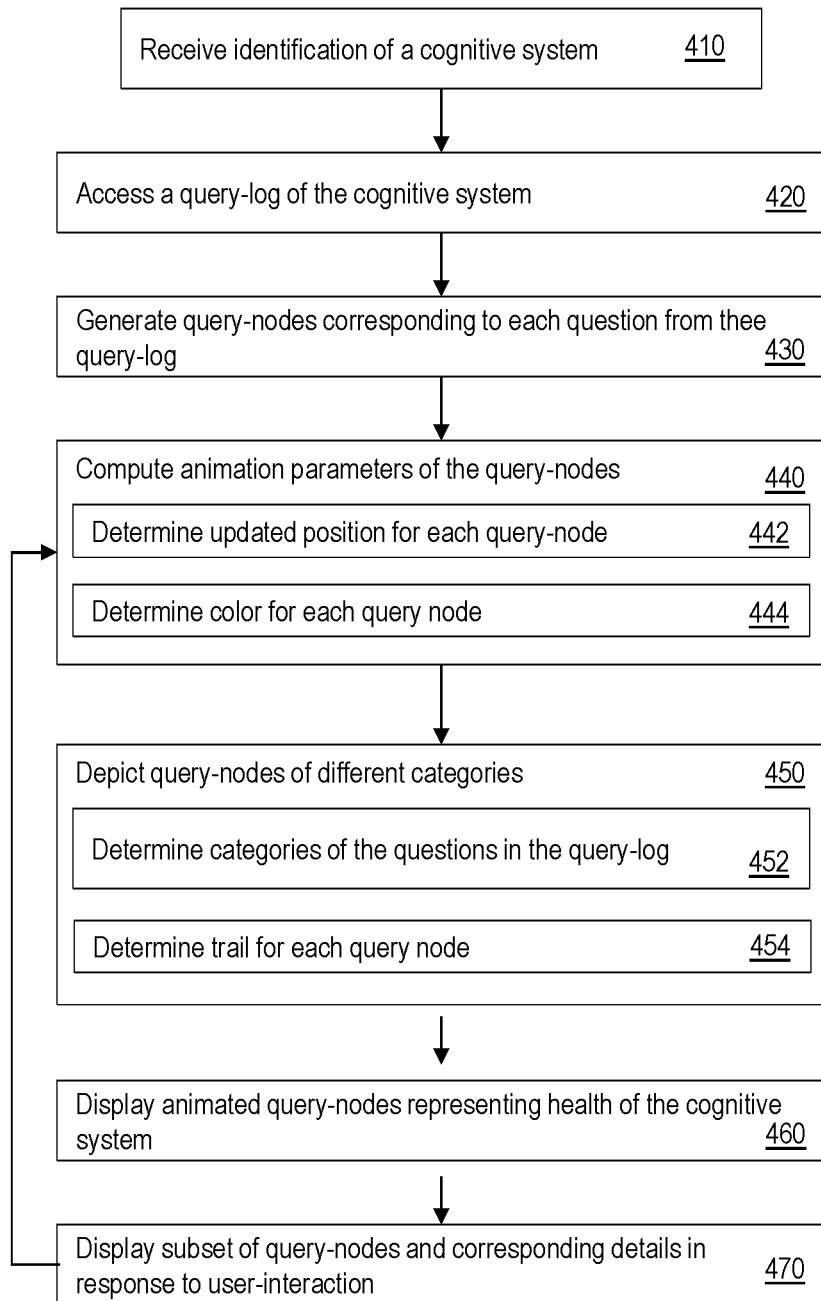
FIG. 4 illustrates a flowchart of an example method for generating a visualization representing the health of a cognitive system in accordance with one or more embodiments.

FIG. 4 illustrates a flowchart of an example method for generating the visualization representing the health of the cognitive system 110 using the query-nodes. The analysis system 120 may implement the method in one or more example. For example, the analysis system 120 receives an identification of the cognitive system 110, as shown at block 410. The administrator 125 provides the identification of the cognitive system 110. The identification may be a network identifier, such as an IP address, a computer-name, or any other identifier that facilitates the analysis system 120 to access the cognitive system 120. In one or more examples, the administrator 125 may provide access to the query-log of the cognitive system 110, instead of the identification of the cognitive system 110. For examples, the query-log may be stored at a separate location, such as a data repository, from the cognitive system 110.

The analysis system 120 accesses the query-log of the cognitive system 110, as shown at block 420. The analysis system 120 generates a query-node 305 corresponding to each question in the query-log, as shown at block 430. The analysis system 120 may initiate the query-nodes to a default state. For example, the analysis system 120 may configure the attributes of the query-nodes to predetermined default values. The attributes of each of the query-nodes, such as the query-node 305 include a position, a speed, a course (that is, angle), a color, a trail-color, a shape, an icon, or any other such attributes that affect the representation of the query-node 305. In one or more examples, the speed and the course may be integrated into a velocity vector attribute.

The analysis system 120 further computes attribute values for the query-nodes, as shown at block 440. The analysis system further displays animated query-nodes representing health of the cognitive system 110, by displaying the query-nodes based on the computed attributes, as shown at block 460. The analysis system 120 determines the attributes based on data associated with the corresponding questions of the respective query-nodes. The analysis system 120 computes updated attributes periodically to display an animation representing the health of the cognitive system 110. Alternatively or in addition, the analysis system 120 computes the updated attribute values in response to input(s) from the administrator 125 viewing and interacting with the animation to identify performance improvements.

For example, the analysis system 120 determines positions for each of the query-nodes, as shown at block 442. In one or more examples, the analysis system 120 initializes each of the query-nodes with a predetermined coordinate. The query-nodes move from the initial position (coordinate) based on the corresponding attributes that the analysis system 120 computes in the next frames for the animation.

Alternatively, the analysis system 120 places the query-nodes corresponding to questions of the same category in proximity with each other. For example, the analysis system 120 computes first position coordinates for a first query-node of a first category based on a first predetermined position. The first predetermined position may be associated with the first category. The analysis system 120 may generate a random position, such as a 2D or a 3D coordinate within a predetermined vicinity of the first predetermined position. For example, the predetermined vicinity may include coordinates within a predetermined radius from the first predetermined position. In a similar manner, the analysis system 120 computes second position coordinates for a second query-node of a second category based on a second predetermined position. The analysis system 120 generates the predetermined positions based on the number of categories. Accordingly, the analysis system 120 initializes the query-nodes at position coordinates based on the respective categories of the questions corresponding to the query-nodes.

The analysis system 120 computes an animation for the query-nodes. For example, the analysis system 120 determines a movement vector for each query-node, as shown at block 454. The movement vector identifies a movement direction and speed (or animation) of the query-node 305 from a current position to a next position, where the query-node is displayed in a next frame. The analysis system 120 determines the movement vector for each query-node by computing a separation steer to avoid crowding local flockmates, and alignment steer towards an average heading of local flockmates, and cohesion steer to move the query-node toward the average position of local flockmates. The three steer values change the speed and course of the query-node and can be applied in any order to update the position of the query-node.

The local flockmates of the query-node 305 are neighboring query-nodes that are within a predetermined distance from the query-node 305. The flockmates affect the movement of the query-node 305. The query-node 305 and the flockmates are collectively referred to as a flock.

In one or more examples, to compute the cohesion steer, the analysis system 120 makes the query-node 305 move towards a center of mass of the flock to which the query-node 305 belongs. For example, consider that the flock contains N query-nodes, $q_1, q_2 \ldots q_n$, and that the query node 305 is the $j^{th}$ query-node (qj) of the flock. In one or more examples, the analysis system computes the center of mass (CM) of the entire flock by computing an average position of the N query-nodes. For example, CM=(q1.position+q2.position+ . . . +qN.position)/N, where $q_i$.position represents a position vector (for example, 2D coordinate, or 3D coordinate).

In one or more examples, the analysis system 120 computes the center of mass for computing the movement vector for $q_j$ ($CM_j$) of the flock by computing an average position of all the other query-nodes of the flock, except the query-node 305. For example, $$CM_j=(q1.\text{position}+q2.\text{position}+ \ldots +qJ-1.\text{position}+bJ+1.\text{position}+ \ldots +bN.\text{position})/(N-1)$$

The analysis system 120 then computes the movement of the query-node 305 towards the center of mass by displacing the query-node 305 by a predetermined scale. For example, if the predetermined scale moves the query-node 305 towards the center of mass by 5% in each frame, the analysis system computes the cohesion steer as a vector offset $v_1$ for the query-node 305 by computing $v_1=(CM-q_j.\text{position})*5/100$. It is understood that CM may be replaced by CMj in other examples. Further, the predetermined scale may be different in other examples, for example 1%, 2%, 10%, and so on. In one or more examples, the scale is based on the confidence value of the question. For example, a question that is assigned a higher confidence value moves faster than a question that is assigned a lower confidence value. Accordingly, query-nodes corresponding to questions with similar confidence values move together. In one or more examples, the scale is based on a difference between the confidence value and the confidence value threshold. Accordingly, based on the position and movement vectors, the analysis system 120 separates the query-nodes of similar confidence values and depicts the query-nodes with similar confidence values as moving together.

The analysis system 120 computes the steer to avoid crowding local flockmates to avoid collisions between the query-nodes. Accordingly, if a neighboring query-node is within a second predetermined distance from the query-node 305, the analysis system 120 computes a separation steer value (S). For example, if the second neighboring query-node is q, $S=S-(q.\text{position}-q_j.\text{position})$. In one or more examples, the analysis system computes the separation steer value based on each neighboring node within the second predetermined distance from the query-node 305. For example, Table 1 provides an example pseudo code to compute the separation steer vector $v_2$.

TABLE 1

```
ComputeSeparationVector(query-node qj)
{
    Vector S = 0;
    D = Second-Predetermined-Distance;
    FOR EACH neighboring query-node q
    {
        IF (|q.position − qJ.position| < D)
            S = S − (q.position − qj.position)
    }
    RETURN S
}
```

The analysis system 120 further computes the alignment steer to make query-nodes mimic each other's course and speed, and avoid the query-nodes bouncing around. In one or more examples, the analysis system 120 the alignment steer vector updates the course and speed of the query-node 305. In one or more examples, the analysis system 120 computes the alignment steer vector (V) by computing average velocities of the neighboring flockmates. V updates both, the course and the speed of the query-node 305. Table 2 provides an example pseudocode for computing the alignment steer vector $v_3$.

TABLE 2

```
ComputeAlignmentSteer (query-node qJ)
{
    Vector V = 0;
    FOR EACH neighboring query-node q
    {
        A = A + q.velocity − qj.velocity;
    }
    V = V / N−1;
    RETURN V;
}
```

The analysis system 120 updates the speed and course of the query-node 305 based on the steer values. For example, qj.velocity=qj.velocity+$v_1$+$v_2$+$v_3$. Using the updated velocity, the analysis system 120 updates the position of the query-node 305. For example, for each unit time the new position of the query-node 305 is computed by qj.position=qj.position+qj.velocity.

In one or more examples, additional or different steer vector values are computed. In one or more examples, the analysis system 120 scales one or more of the steer vector values of the query-node 305 based on the attributes of the corresponding question. For example, as described herein, the $v_1$ may be scaled based on the confidence value of the question. Further, if the corresponding question is from a specific category, the steer vectors of the query-node 305 may be scaled in a specific manner to exhibit a smooth or a chaotic behavior.

In one or more examples, the analysis system 120 uses different sets of neighboring query-nodes for computing the different steering vectors. For example, the cohesion steer vector $v_1$ may be computed based on a first set of neighboring query-nodes, which are within a first predetermined distance from the query-node 305; the steer vector $v_2$ to avoid crowding local flockmates is computed using a second set of neighboring query-nodes, which are within a second predetermined distance from the query-node 305; and the alignment steer vector $v_3$ is computed using a third set of neighboring query-nodes, which are within a third predetermined distance from the query-node 305.

Further, the analysis system 120 determines a color for the query-node 305 based on the confidence value and the confidence value threshold, as shown at block 444. For example, the analysis system 120 depicts the query-node 305 using a first color if the corresponding question has a confidence value below (or equal to) the confidence value threshold, and a second color if the confidence value is above (or equal to) the confidence value threshold. As described herein, the administrator 125 chooses the confidence value threshold using the confidence value scale 350. The analysis system 120, thus, depicts the query-nodes that may be considered 'problematic,' that is having a lower confidence value than the confidence value threshold, using the first color. The analysis system 120 depicts the query-nodes that have confidence value above the confidence value threshold using the second color.

In one or more examples, the analysis system 120 uses different icons to represent the query-nodes with different confidence values. For example, query-nodes corresponding to different confidence values may be represented using respective icons. Alternatively, the icons may be selected based on a difference between the confidence values and the confidence threshold value.

Thus, based on the color and the flocking of the query-nodes, the analysis system 120 facilitates the administrator 125 in identifying whether the cognitive system 110 is in a 'healthy' state or not based on the confidence value threshold selected by the administrator 125. For example, in a healthy state, a majority of the query-nodes has corresponding confidence values above the selected confidence value threshold and is moving in a synchronous pattern. Whereas, in an unhealthy state, the majority of the query-nodes has corresponding confidence values below the selected confidence value threshold and is moving chaotically.

The analysis system 120 further facilitates the administrator 125 to identify questions in specific categories. For example, the analysis system 120 depicts query-nodes of different categories in a different manner, as shown at block 450. For example, the analysis system 120 determines a category of the question corresponding to the query-node 305, as shown at block 452. The analysis system 120 colors a trail of the query-node based on the category of the corresponding question, as shown at block 454. In one or more examples, the analysis system 120 scales the steer values of the query-nodes of a first category in a first manner and the steer values of the query-nodes of a second category in a different manner. Accordingly, query-nodes of the first category move in a first pattern, which is different from a second pattern in which the query-nodes of the second category move.

For example, as depicted in the example of FIG. 3, in the case of two categories, the visualization includes two separate flocks corresponding to the two categories (310 and 320) with each query-node in the two categories moving according to respective confidence values and categories.

In one or more examples, the analysis system 120 determines the flocks based on the data in the query-log. For example, the analysis system 120 determines categories of the questions from the query-log. In one or more examples, the cognitive system 110 stores the category of the question in the corresponding entry in the query-log. Alternatively, the analysis system 120 determines the category of the question by parsing the question from the query-log.

For example, the analysis system 120 flocks the query-nodes corresponding to the questions that the cognitive system 110 was not trained to answer. For example, the cognitive system may not have information to respond to such questions despite parsing the questions. For example, the set of problematic topics 310 illustrated in FIG. 3 represents such a flock of questions that the cognitive system 110 parsed successfully and failed to respond to because of lack of training on the topic of the questions. The example in FIG. 3 illustrates that the cognitive system 110 failed to respond to questions related to the topic of insurance policies. It is understood that other examples may identify a different topic. Further, the cognitive system 110 may fail to respond to the questions of more than one topic. Here, a failure to respond indicates that the confidence value assigned to the questions is below the confidence value threshold. The administrator 125, upon identifying such questions may improve the performance of the cognitive system 110 by further training the cognitive system 110 in the identified topic(s). Additionally or alternatively, the cognitive system 110 identifies unknown terms in the received questions, as illustrated by the set of unknown domain terms 320 in FIG. 3. The analysis system 110 flocks the questions with unknown domain terms. The set of unknown domain terms 320 represent terms that the cognitive system 110 had difficulty to parse syntactically or semantically. The administrator 125, in response, may update a lexicon of the cognitive system 110.

The analysis system 120 marks the query-nodes corresponding to the questions in the same category as query-nodes belonging to a flock, using the trails. Thus, the analysis system 120 depicts to the administrator 125, different issues that the cognitive system 110 is facing, facilitating the administrator 125 to act accordingly to improve the performance of the cognitive system 110.

The analysis system 120 displays the animated query-nodes representing health of the cognitive system 110 according to the attributes computed, as shown at block 470. In one or more examples, the analysis system 120 updates the attributes of the query-nodes and displays the query-nodes according to a predetermined frequency. The predetermined frequency facilitates an animated visualization representing the health of the cognitive system 110.

Figure 5:
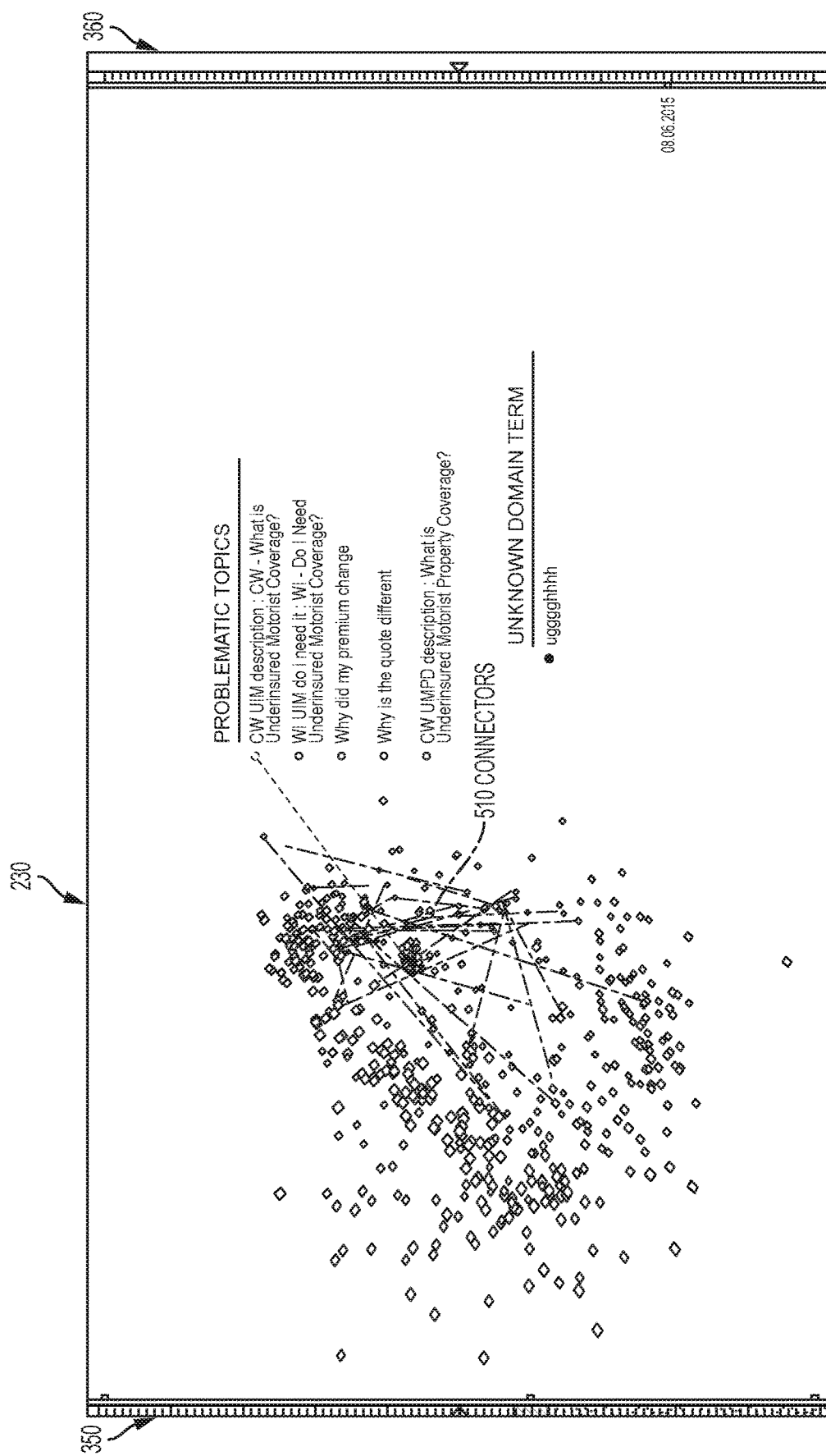
FIG. 5 illustrates an example visualization of the health of a cognitive system in accordance with one or more embodiments.
Figure 6:
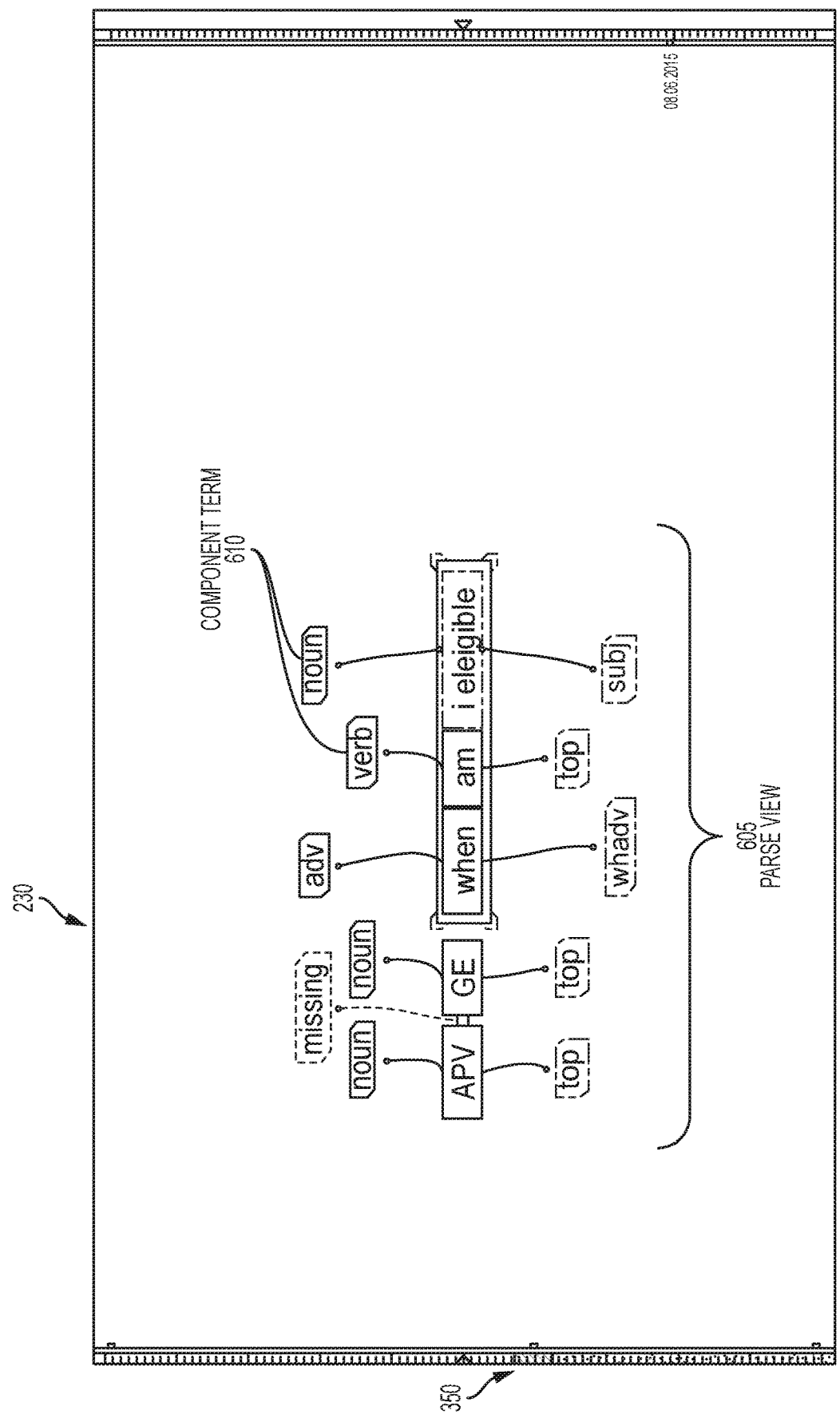
FIG. 6 illustrates an example visualization of the health of a cognitive system in accordance with one or more embodiments.

The analysis system 120 further facilitates the administrator 125 to interact with the visualization that includes the animated query-nodes. For example, as illustrated in FIG. 5, if the administrator selects the query-node 305, the analysis system 120 displays connectors 510 between the query-nodes of the category to which the query-node 305 belongs. For example, in the example of FIG. 5, the administrator selects the query-node 305 that belongs to the problematic topics category 310. Accordingly, the analysis system 120 depicts the connectors between the query-nodes of the category 310. Alternatively or in addition, the analysis system 120 lists the questions corresponding to the query-nodes of the selected category. If the administrator 125 selects one of the questions listed, the analysis system 120 displays a parsed view 605 of the question, as shown at FIG. 6. The parse view displays a visual break down of how the cognitive system 110 parsed the question.

Further, the analysis system 120 facilitates the administrator to zoom in and explore a specific category of questions by exploring the connected query-nodes. For example, the administrator may select to zoom-in or zoom-out of the connected query-nodes to view details of the corresponding questions. Alternatively or in addition, the administrator may select to switch the connectors off by selecting another query-node or an open space. In one or more examples, the administrator 125 inputs selection via an input-device such as a mouse, a keyboard, a joystick, a touchscreen, or any other input device.

In one or more examples, the administrator 125 selects a subset of the questions from the query-log to be represented in the visualization. For example, the administrator 125 specifies a time range using the time scale 360. For example, the administrator 125 may select a starting date of Aug. 6, 2015. Based on the selection, the analysis system 110 only uses the questions that the cognitive system 110 received after Aug. 6, 2015 (see FIG. 3). Alternatively or in addition, the administrator 125 may select an ending date for the time range, for example Dec. 31, 2015. Accordingly, the analysis system 120 only uses questions that were received between Aug. 6, 2015, and Dec. 31, 2015. It is understood that the administrator 125 may select any other starting date and/or ending date for the time range.

Accordingly, the analysis system 120 represents the health of the cognitive system 110 based on a selected subset of the query-log. The analysis system 120 generates and displays a visualization that includes one or more flocks of query-nodes. Each query-node in a flock represents a single question that the cognitive system 110 has been asked by the user 105. The movement behavior of each individual query-node is based on the confidence assigned by the cognitive system corresponding to an ability to answer the question. The query-nodes representing questions that the cognitive system 110 is confident in answering fly in harmony, while query-nodes representing questions that the cognitive system 110 is not confident in answering fly more erratically. Thus, when the cognitive system 110 is performing well on at least a predetermined proportion of questions, the query-nodes appear to flock together, suggesting a harmonious cognitive system 110. Alternately, when the cognitive system 110 is performing poorly, at least a predetermined proportion of the query-nodes fly chaotically, showing that the cognitive system 110 is in poor health and in need of improvement.

Thus, the technical solutions described herein determine and depict health of a cognitive system that answers user submitted questions using artificial intelligence. In one or more examples, the health is depicted using computer animation, such as computer animated flocking behavior to represent the health of the cognitive system. Further, the visual representation of the health is interactive and facilitates an administrator of the cognitive system to interact with the performance data that used to generate the visual representation. For example, the interaction facilitates the administrator to identify specific problems hampering the performance of the cognitive system and improve the performance accordingly. For example, the administrator may impart additional/different training to the cognitive system, may expand a lexicon of the cognitive system, and/or may undertake any other improvement. Accordingly, the technical solutions described herein provide a free flowing computer generated animation that depicts the health of the cognitive system that uses dynamic clustering to facilitate the administrator to identify performance issues with the cognitive system and take corrective actions. The technical solutions further facilitate the administrator to determine details of specific performance issues by interacting with the computer generated animation.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>"

or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for visually depicting health of a cognitive system, the method comprising:
   analyzing performance data of the cognitive system to determine the health of the cognitive system;
   accessing a query-log of a question input to the cognitive system;
   generating a query-node corresponding to the question, wherein the query-node corresponds to an entry in the query-log of the cognitive system;
   configuring animation parameters of the query-node based on the query-log by determining a movement vector for the query-node, wherein the movement vector is determined by computing a separation steer value, an alignment steer value and a cohesion steer value;
   displaying movement of the query-node according to the movement vector based on the analyzed performance data, wherein the movement of the query node with respect to movements of neighboring query-nodes is indicative of the health of the cognitive system, the query-node and the neighboring query-nodes each comprising a seperate trail; and
   marking the trail for each of the query-node and the neighboring query-nodes to individually define a category of the question associated with each of the query-node and the neighboring query-nodes.

2. The computer implemented method of claim 1, wherein the query-log comprises a confidence value associated with the question.

3. The computer implemented method of claim 1, wherein the query-log comprises a category associated with the question.

4. The computer implemented method of claim 1, wherein configuring the animation parameters comprises determining position coordinates of the query-node.

5. The computer implemented method of claim 4, wherein the position coordinates are determined based on animation parameters of the neighboring query-nodes.

6. The computer implemented method of claim 5, wherein the neighboring query-nodes are located within a predetermined distance from the query-node.

7. The computer implemented method of claim 1, wherein configuring the animation parameters comprises determining a color of the query-node.

8. The computer implemented method of claim 7, wherein the color of the query-node is based on a difference between a confidence value corresponding to the question and a confidence threshold.

9. The computer implemented method of claim 8, further comprising receiving the confidence threshold at runtime.

10. A system for visually depicting health of a cognitive system, the system comprising:
    a memory;
    a display unit; and
    a processor coupled with the memory and the display unit, the processor configured to:
      analyze performance data of the cognitive system to determine the health of the cognitive system;
      access a query-log of a question input to the cognitive system;
      generate a query-node corresponding to the question, wherein the query-node corresponds to an entry in the query-log of the cognitive system;
      configure animation parameters of the query-node based on the query-log by determining a movement vector for the query-node, wherein the movement vector is determined by computing a separation steer value, an alignment steer value and a cohesion steer value;
      cause the display unit to display movement of the query-node according to the movement vector based on the analyzed performance data, wherein the movement of the query node with respect to movements of neighboring query-nodes is indicative of the health of the cognitive system, the query-node and the neighboring query-nodes each comprising a seperate trail; and
      mark the trail for each of the query-node and the neighboring query-nodes to individually define a category of the question associated with each of the query-node and the neighboring query-nodes.

11. The system of claim 10, wherein the query-log comprises a confidence value associated with the question.

12. The system of claim 10, wherein the query-log comprises a category associated with the question.

13. The system of claim 10, wherein configuring the animation parameters comprises determining position coordinates of the query-node.

14. The system of claim 13, wherein the position coordinates are determined based on animation parameters of the neighboring query-nodes.

15. The system of claim 10, wherein configuring the animation parameters comprises determining a color of the query-node.

16. The system of claim 15, wherein the color of the query-node is based on a difference between a confidence value corresponding to the question and a confidence threshold.

17. A computer program product for visually depicting health of a cognitive system, the computer program product comprising a computer readable storage medium, the computer readable storage medium comprising computer executable instructions, wherein the computer readable storage medium comprises instructions to:
 analyze performance data of the cognitive system to determine the health of the cognitive system;
 access a query-log of a question input to the cognitive system;
 generate a query-node corresponding to the question, wherein the query-node corresponds to an entry in the query-log of the cognitive system;
 configure animation parameters of the query-node based on the query-log by determining a movement vector for the query-node, wherein the movement vector is determined by computing a separation steer value, an alignment steer value and a cohesion steer value;
 cause a display unit to display movement of the query-node according to the movement vector based on the analyzed performance data, wherein the movement of the query node with respect to movements of neighboring query-nodes is indicative of the health of the cognitive system, the query-node and the neighboring query-nodes each comprising a seperate trail; and
 mark the trail for each of the query-node and the neighboring query-nodes to individually define a category of the question associated with each of the query-node and the neighboring query-nodes.

18. The computer program product of claim 17, wherein the query-log comprises a confidence value associated with the question.

19. The computer program product of claim 17, wherein the query-log comprises a category associated with the question.

20. The computer program product of claim 17, wherein configuring the animation parameters comprises determining position coordinates of the query-node.

* * * * *